United States Patent
Kim et al.

(10) Patent No.: US 10,114,793 B2
(45) Date of Patent: Oct. 30, 2018

(54) METHOD AND APPARATUS FOR DETERMINING A WORK-GROUP SIZE

(71) Applicant: Samsung Electronics Co., Ltd., Suwon-si (KR)

(72) Inventors: Seonggun Kim, Seoul (KR); Donghoon Yoo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 453 days.

(21) Appl. No.: 14/793,338

(22) Filed: Jul. 7, 2015

(65) Prior Publication Data
US 2016/0154679 A1     Jun. 2, 2016

(30) Foreign Application Priority Data
Nov. 28, 2014    (KR) .................. 10-2014-0169184

(51) Int. Cl.
*G06F 15/80*     (2006.01)
*G06F 8/41*     (2018.01)
*G06Q 10/00*     (2012.01)

(52) U.S. Cl.
CPC .............. *G06F 15/80* (2013.01); *G06F 8/443* (2013.01); *G06Q 10/00* (2013.01)

(58) Field of Classification Search
CPC .......... G06F 15/80; G06F 8/443; G06Q 10/00
See application file for complete search history.

(56) References Cited

U.S. PATENT DOCUMENTS

| | | | |
|---|---|---|---|
| 2008/0216083 A1 | 9/2008 | Trotter | |
| 2011/0055839 A1 | 3/2011 | Alexander et al. | |
| 2011/0314442 A1* | 12/2011 | Bondhugula | G06F 8/51 717/106 |
| 2011/0314453 A1 | 12/2011 | Tebeka et al. | |
| 2014/0156971 A1 | 6/2014 | Kunze et al. | |

FOREIGN PATENT DOCUMENTS

| | | | | |
|---|---|---|---|---|
| KR | 10-2012-0054027 A | | 5/2012 | |
| KR | 20140093593 | * | 7/2014 | ............... G06F 9/06 |

OTHER PUBLICATIONS

Xiang et al., "All-Window Profiling and Composable Models of Cache Sharing", Proceedings of the 16th ACM Symposium on Principles and Practice of Parallel Programming, pp. 91-102, 2011.*
Chen et al., "Accurate and Complexity-Effective Spatial Pattern Prediction", Proceedings of IEEE Software, Feb. 14-18, 2004, Madrid, Spain.*

(Continued)

*Primary Examiner* — S. Sough
*Assistant Examiner* — Timothy P Duncan
(74) *Attorney, Agent, or Firm* — Harness, Dickey & Pierce, P.L.C.

(57) ABSTRACT

Methods and apparatuses for determining a work-group size are provided. The method of determining a work-group size includes calculating a first value denoting spatial locality of a memory that is shared by one or more work items included in a work-group, calculating a second value denoting footprints of the one or more work items included in the work-group based on the first value, and determining the work-group size based on the first and second values.

16 Claims, 4 Drawing Sheets

(56) References Cited

OTHER PUBLICATIONS

Ashari et al., "An Efficient Two-Dimensional Blocking Strategy for Sparse Matrix-Vector Multiplication on GPUs", in Proceedings of the 28th ACM International Conference on Supercomputing, pp. 273-282, Jun. 10-13, 2014, Munich Germany (Year: 2014).*

Seo, S. et al., "Automatic OpenCL work-group size selection for multicore CPUs," Proceedings of the 22nd international conference on Parallel architectures and compilation techniques, IEEE Press, 2013 (11 pages).

* cited by examiner

METHOD AND APPARATUS FOR DETERMINING A WORK-GROUP SIZE

CROSS-REFERENCE TO RELATED APPLICATION(S)

This application claims the benefit under 35 USC 119(a) of Korean Patent Application No. 10-2014-0169184, filed on Nov. 28, 2014, in the Korean Intellectual Property Office, the disclosure of which is incorporated herein by reference for all purposes.

BACKGROUND

1. Field

The following description relates to methods and apparatuses for determining a work-group size by using an access pattern to a memory that is shared by work-groups.

2. Description of Related Art

OpenCL is an open-type general purpose parallel computing framework, in which programs executing on multiplex platforms (i.e., a plurality of central processing units (CPUs), graphic processing units (GPUs) and so on) may be created, and the ability of the GPU may be extended to a general purpose graphic processing unit (GPGPU) that is used in areas other than the graphic processing.

Meanwhile, a host program which is executed on a host in the OpenCL program defines a work space to execute a kernel, and a work item corresponds to each point in the work space. A work-group represents a group of several work items, the work space is divided into work-groups. Furthermore, each of the work-groups may be executed at one of computing units on a device in which a kernel is executed. Here, the size of the work-group is a factor having a great effect on the performance of the device because the size of the work-group may determine a resource usage of the device and a load balance between the computing units.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of an exemplary embodiment, a method of determining a work-group size includes calculating a first value denoting spatial locality of a memory that is shared by one or more work items included in the work-group, calculating a second value denoting footprints of the one or more work items included in the work-group based on the first value, and determining the work-group size based on the first and second values.

The calculating the first value may include converting a memory reference, included in a kernel executed in the work-group, to a symbol expression including at least one predetermined symbol; partially evaluating the symbol expression by substituting a value corresponding to the at least one predetermined symbol included in the symbol expression for the symbol expression; and calculating the first value based on the partial evaluation result.

The calculating the first value may further include receiving an actual value corresponding to the at least one predetermined symbol; and mapping the received actual value to the at least one predetermined symbol.

The calculating the first value based on the partial evaluation result may further include calculating a reuse distance by substituting a zero vector and unit vectors for the partially evaluated symbol expression, and calculating the first value based on the calculated reuse distance and a memory line size of the memory.

The calculating the second value may include calculating the second value based on the calculated reuse distance and the memory line size.

The first value may include at least one value in a value denoting spatial locality in a first direction of the work-group and a value denoting spatial locality in a second direction of the work-group.

The determining the work-group size may further include calculating a third value denoting footprints of the work-group, in which the third value may be a multiplication value of the second value and the work-group size.

The determining the work-group size may include determining the work-group size so that the third value is lesser than or equal to the number of lines in the memory.

The determining the work-group size may include determining the work-group size so that the work-group size becomes a multiple of the first value.

The determining the work-group size may include determining the largest work-group size as the work-group size, in the work-group sizes that make the third value becomes smaller than or equal to the number of the lines in the memory, and make the work-group size becomes the multiple of the first value.

According to an aspect of another example, an apparatus for determining a work-group size includes a first operator configured to calculate a first value denoting spatial locality of a memory that is shared by one or more work items included in a work-group, a second operator configured to calculate a second value denoting footprints of the one or more work items included in the work-group based on the first value, and a work-group size determiner configured to determine the work-group size based on the first and second values.

The first operator may convert a memory reference included in a kernel executed in the work-group to a symbol expression including at least one predetermined symbol, partially evaluate the symbol expression by substituting a value corresponding to the at least one predetermined symbol included in the symbol expression for the symbol expression, and calculate the first value based on the partial evaluation result.

The first operator may determine the work-group size that receives actual values corresponding to the one or more symbols, and maps the actual values to the symbols.

The first operator may calculate a reuse distance by substituting a zero vector and unit vectors for the partially evaluated symbol expression, and calculate the first value based on the calculated reuse distance and a memory line size memory of the memory.

The second operator may calculate the second value based on the calculated reuse distance and the memory line size.

The first value may include at least one value in a value denoting spatial locality in a first direction of the work-group and a value denoting spatial locality in a second direction of the work-group.

The second operator may calculate a third value denoting footprints of the work-group, in which the third value may be a multiplication value of the second value and the work-group.

The work-group size determiner may determine the work-group size so that the third value is lesser than or equal to the number of lines in the memory.

The work-group size determiner may determine the work-group size so that the work-group size becomes a multiple of the first value.

The work-group size determiner may determine the largest work-group size as the work-group size, in the work-group sizes that make the third value becomes smaller than or equal to the number of the lines in the memory, and make the work-group size becomes the multiple of the first value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
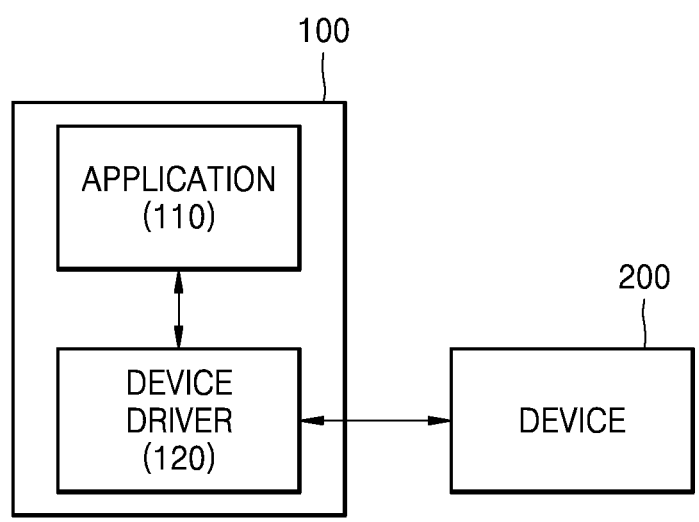
FIG. 1 is a block diagram illustrating a structure of a system in which a general purpose graphic processing unit (GPGPU) runs according to an example.

FIG. 1 is a block diagram illustrating a structure of a system in which a general purpose graphic processing unit (GPGPU) runs according to an example.

Referring to FIG. 1, the system that enables the GPGPU to run includes a host 100 and a device 200. However, the system illustrated in FIG. 1 is not limited thereto and thus may include more or less components. That is, the system may include more than one host and one device[DXR1].

The host 100 is an apparatus for controlling the device 200 so that a program is executed on the device 200 which is connected to the host 100. In one configuration, the host 100 includes a CPU. Furthermore, the host 100 includes an application 110 and a device driver 120 but is not limited thereto. That is, the host 100 may include components other than the application 110 and the device driver 120. For example, the host may include a memory (not shown[DXR2]).

In one configuration, the device 200 is a group of units (that is, computing units) capable of calculating in parallel. Alternatively, the group of units may be capable of simultaneous calculations[DXR3]. The computing units may include a graphic processing unit (GPU), a central processing unit (CPU), a digital signal processor (DSP), and so on.

Further, programs executed in the GPGPU system include a host program and a device program. For example, the application 110 consists of the host program. The host 100 executes the host program, and the host program is configured to control an executing process of the device program. Furthermore, the device 200 executes the device program, and the device program is generated and managed by the host program. The program is a group of kernels, and the kernel is an object having an instruction word set (function).

The application (i.e., host program) 100 transmits a source code and a build option to the device driver 120 through a predefined application programming interface (API) so as to execute the device program on the device 200. The device driver 120 builds the device program and transmits the result to the application 110 by using the received source code and build option.

The application 110 selects a kernel that is a function executing a specific function in the built device program, and generates the selected kernel. Furthermore, the application 110 sets a value of an argument that is transmitted to the kernel. When the application 100 inputs the generated kernel to a command queue in order to execute the kernel on the device 200, the device 200 executes the kernel in an input order.

Figure 2:
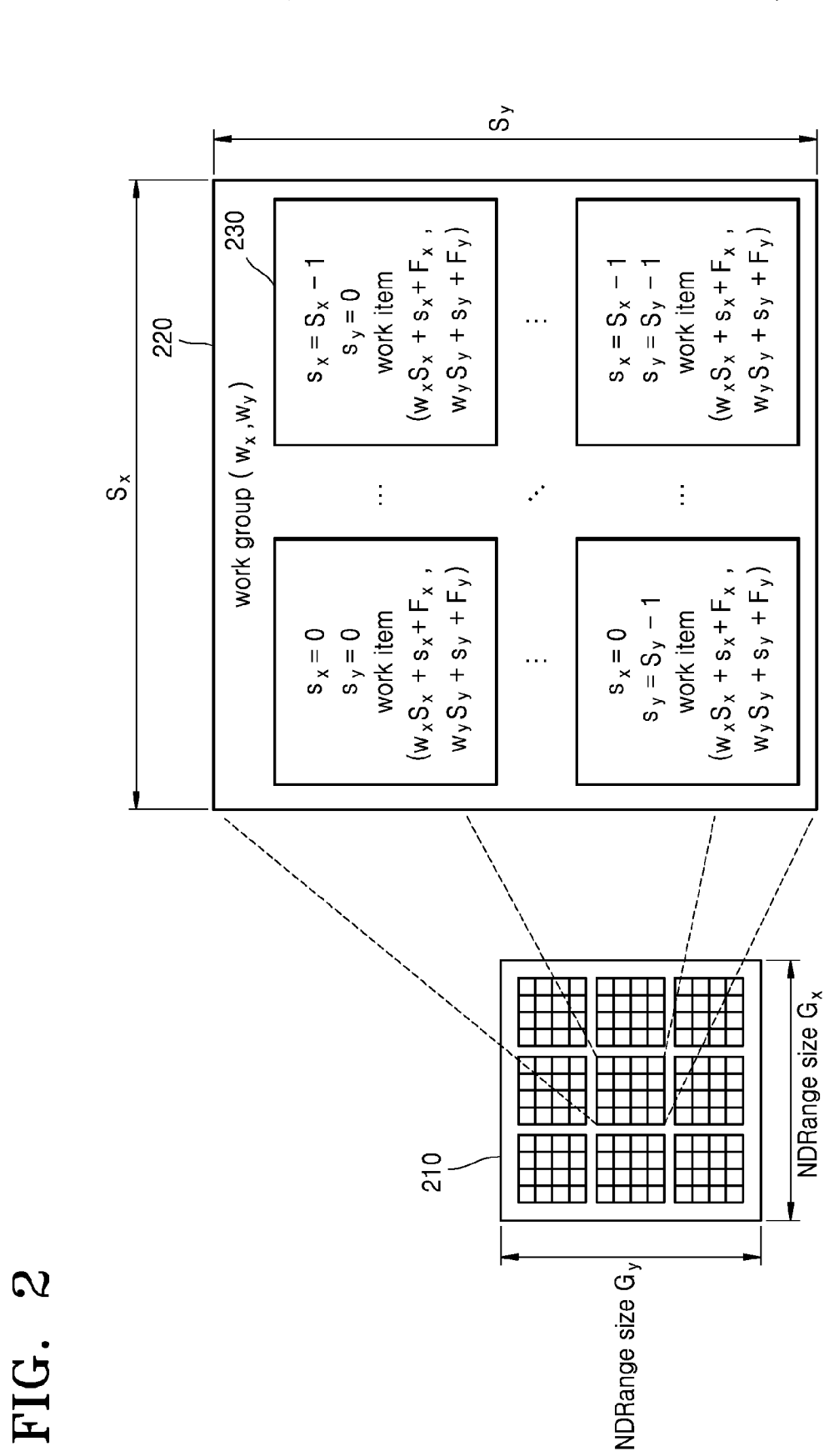
FIG. 2 is a diagram for explaining a work space according to an example.

Meanwhile, in accordance with one configuration, the device 200 executes the kernel in a work space 210. For example, as shown in FIG. 2, the device 200 performs data processing in the work space 210. The work space 210 includes one or more work-groups 220. Furthermore, one work-group 220 includes one or more work items 230. The work items may be basic units of parallel data processing and each of the work items may correspond to each of threads, but the example is not limited thereto. Furthermore, the work items included in an identical work space may be simultaneously executed. Alternatively, the work items included in an identical work space may be separately executed[DXR4].

Referring to FIG. 2, in accordance with one configuration, a size (i.e., a global size) of the work space 210 is Gx*Gy in size.

Furthermore, each of the work-groups 220 included in the work space 210 has a work-group ID and is represented as (Wx, Wy). In addition, one work-group 220 has Sx*Sy in size. Here, each of the work items 230 included in the work-groups 220 has a local ID and is represented as (sx, sy). Furthermore, a global ID corresponding to the local ID (sx, sy) is represented as (Wx*Sx+sx+Fx, Wy*Sy+sy+Fy). Here, (Fx, Fy) represents a starting point (offset) of the work space 210.

Further, the application 110 may specify the number of dimensions of the work space 210 in which the kernel will be executed, the starting point and the size of the work space 210, and the work-group size as shown in Table 1.

TABLE 1

| cl_int | clEnqueueNDRangeKernel (cl_command_queue command_queue, cl_kernel kernel, |
|---|---|
| Define an NDRange | cl_uint work_dim, const size_t *global_work_offset, const size_t *global_work_size, const size_t *local_work_size, cl_uint mm_events_in_wait_list, const cl_event *event_wait_list, cl_event *event) |

In Table 1, work_dim represents the number of dimensions of the work space in which the kernel will be executed, global_work_offset represents the starting point of the work space, global_work_size represents the size of the work space, and local_work_size represents the size of the work-group.

However, the starting point may be set as (0, 0, 0) and the work-group size may be determined by the device driver 120 when the application 110 does not specify the starting point and the work-group size, but the example is not limited thereto.

In accordance with one configuration, the device driver 120 determines the work-group size in consideration of a memory access pattern when the work items included in the work-groups are executed.

Figure 3:
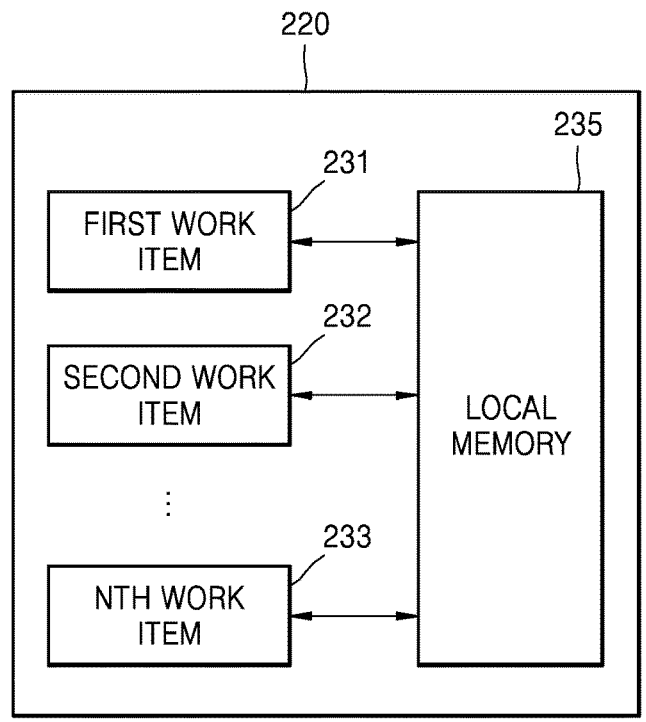
FIG. 3 is a block diagram illustrating an example of a memory system in a work-group.

FIG. 3 is a block diagram illustrating an example of a memory system in the work-groups.

Referring to FIG. 3, one work-group 220 includes N work items (i.e., a first work item 231, a second work item 232, . . . , and an Nth work item 233) and further include a local memory 235. The work items (N work items) included in the work-group 220 share the local memory 235. The local memory 235 may include a cache memory.

Here, cache thrashing may occur when the number of cache lines required by the work items that are simultaneously executed is larger than the number of all cache lines included in the cache memory.

Furthermore, data stored in the cache memory may have spatial locality when addresses of the data required to execute the work items are adjacent to each other. Cache memory having spatial locality refers to pieces of data having addresses close to specific data access one another in order. In addition, the work items access with different words in an identical cache line when the cache memory has spatial locality.

In accordance with one configuration, an apparatus for determining a work-group size determines the work-group size so that spatial locality of the cache memory is maximized. This is achieved by taking into consideration whether spatial locality of the cache memory is generated along with a direction in dimension in the work space.

Furthermore, the work-group size may be limited by a resource constraint of the device 200. For example, the work-group size must satisfy Inequalities 1 and 2 as shown below, due to the resource constraint of the device 200.

local_work_size[0]* . . . *local_work_size
    [work_dim−1]≤min(CL_DEVICE_MAX-
    WORK_GROUP_SIZE, CL_KERNEL_WOR-
    K_GROUP_SIZE)    Inequality 1

Referring to Inequality 1, the work-group size should be smaller than or equal to a smaller value of the maximum value (CL_DEVICE_MAX_WORK_GROUP_SIZE) of the work-group size that is supported by the device 200 and the maximum number (CL_KERNEL_WORK_GROUP_SIZE) of the work item that may be included in one work-group when the kernel is executed on the device 200.

local_work_size[i]≤CL_DEVICE_MA-
    X_WORK_ITEM_SIZES[i]    Inequality 2

Referring to Inequality 2, the work-group size (local_work_size[i]) in each direction should be smaller than or equal to the maximum number (CL_DEVICE_MAX_WORK_ITEM_SIZES[i]) of the work items in each direction that is included in a work-group supported by the device 200.

Figure 4:
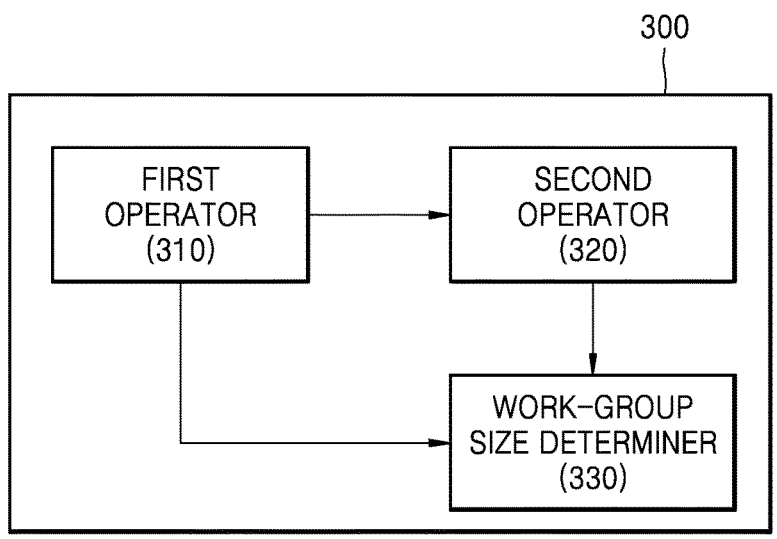
FIG. 4 is a block diagram of a structure of an apparatus for determining a work-group size according to an example.

FIG. 4 is a block diagram of a structure of an apparatus for determining a work-group size according to an example.

The apparatus 300 for determining the work-group size in FIG. 4 may be formed of the device driver 120 (of FIG. 1).

Referring to FIG. 4, the apparatus 300 includes a first operator 310, a second operator 320 and a work-group size determiner 330. Although the first operator 310, the second operator 320 and the work-group size determiner 330 are included in the apparatus 300, these components may be embodied as independent hardware. Therefore, the apparatus 300 illustrated in FIG. 4 is not limited thereto and thus the apparatus 300 may include more or less components [DXR5].

The first operator 310 generates a symbol expression with respect to memory references included in the kernel. The kernel may be represented as code as shown in Table 2 below.

TABLE 2

```
__kernel void example(__global float *input,
                      __global float *output,
                      int n)
{
    int pX = get_global_ID (0);
    int pY = get_global_ID (1);
    int W = get_global_size(0);
    int H = get_global_size(1);
    float avr = (input [pY * W + pX] + input [pY * W + pX + n]) / 2.0f;
    output [pX * H + 2 * pY] = avr;
}
```

The memory references refer to reading data stored in a memory, or storing data in a memory. For example, referring to Table 2, the memory references include input [pY*W+pX] (hereinafter referred to as a "first memory reference"), input [pY*W+pX+n] (hereinafter referred to as a "second memory reference"), and output [pX*H+2*pY] (hereinafter referred to as a "third memory reference").

Further, each function included in the kernel may be represented as symbols as shown in Table 3 below.

TABLE 3 get_local_ID (dim): Lx, Ly, Lz
get_local_size(dim): nLx, nLy, nLz
get_group_ID (dim): Gx, Gy, Gz
get_num_groups(dim): nGx, nGy, nGz
get_global_offset(dim): Ox, Oy, Oz
get_global_ID (dim): Ox + Lx + Gx * nLx, Oy + Ly + Gy * nLy, Oz + Lz + Gz * nLz
get_global_size(dim): nLx * nGx, nLy * nGy, nLz * nGz Referring to Table 3, all symbols except Lx, Ly, Lz, Gx, Gy, and Gz from among symbols with respect to index IDs of the work items may be regarded as a constant. Furthermore, in the case of the work items included in an identical work-group, Gx, Gy, and Gz may also be regarded as a constant since the Gx, Gy, and Gz have an identical value. Therefore, the index IDs of the work items may include Lx, Ly, and Lz.

Meanwhile, pX may represent Ox+Lx+Gx*nLx, pY may represent Oy+Ly+Gy*nLy, W may represent nLx*nGx, and H may represent nLy*nGy, in which the pX, pY, W and H are included in the first to third memory references.

The first operator 310 replaces the first to third memory references with the symbols as mentioned above and converts them to symbol expressions as shown in Table 4 below.

TABLE 4

(1)input [pY * W + pX]
  ->input [(Oy + Ly + Gy * nLy) * (nLx * nGx) + (Ox + Lx + Gx * nLx)]
  -> input [(nLx * nGx) * Ly
      +      Lx
      + (Oy * nLx * nGx + Gy * nLy * nLx * nGx + Ox + Gx * nLx)]
      : (first symbol expression)
(2)input [pY * W + pX + n]
  ->input [(Oy + Ly + Gy * nLy) * (nLx * nGx) + (Ox + Lx + Gx * nLx) + n]
  -> input [(nLx * nGx) * Ly
      +      Lx
      + (Oy * nLx * nGx + Gy * nLy * nLx * nGx + Ox + Gx * nLx + n)]
      : (second symbol expression)
(3) output [pX * H + 2 * pY]
  -> output [(Ox + Lx + Gx * nLx) * (nLy * nGy) + (Oy + Ly + Gy * nLy)]
  -> output [(nLy * nGy) * Lx
      +     2 * Ly
      + (Ox * nLy * nGy + Gx * nLx * nLy * nGy + Oy + Gy * nLy)]
      : (third symbol expression)

Further, the first operator 310 replaces the memory references included in the kernel with the symbol expressions when the device program is built. Furthermore, when receiving a clBuildProgram( ) API, the first operator 310 replaces the memory references with the symbol expressions in response thereto.

The first operator 310 partially evaluates the symbol expressions by substituting actual values for one or more symbols included in the symbol expressions.

The first operator 310 substitutes the actual values mapped in the symbols for the symbol expressions. For example, symbols corresponding to parameters of the kernel may include 'input', 'output', and 'n', and the first operator 310 receives actual values (argument) of each of the parameters through an API such as clSetKernelArg. Furthermore, the first operator 310 maps the actual values of each of the received parameters in symbols of each of the parameters as shown in Table 5 below.

TABLE 5

<input, 0x1000>
<output, 0x2000>
<n, 1>

In addition, when execution of the kernel is requested (i.e., when clEnqueueNDRangeKernel( ) API is called), the first operator 310 maps the given value to a corresponding symbol when a starting point and a size of the work space are given.

For example, when a starting point (global_work_offset) of the work space is given as {0, 0}, and a size (global_work_size) of the work space is given as {1024, 768}, the first operator 310 maps the given values to symbols as shown in Table 6 below.

TABLE 6

<Ox, 0>
<Oy, 0>
<nLx * nGx, 1024>
<nLy * nGy, 768>

The first operator 310 partially evaluates the symbol expressions (the first to third symbol expressions) by using the actual values mapped in the parameters or the symbols as shown in Tables 5 and 6.

The partial evaluation results of the first to third symbol expressions will be shown in Table 7 below.

TABLE 7

(1) first symbol expression: 0x1000[1024 * Ly + Lx + (1024 * Gy * nLy + Gx * nLx)]
(2) second symbol expression: 0x1000[1024 * Ly + Lx + (1024 * Gy * nLy + Gx * nLx + 1)]
(3) third symbol expression: 0x2000[768 * Lx + 2 * Ly + (768 * Gx * nLx + Gy * nLy)]

The first operator 310 groups the first to third symbol expressions that are partially evaluated.

For example, the first operator 310 groups the symbol expressions based on coefficients of base addresses and index IDs (i.e., Lx and Ly) thereof, and classifies symbol expressions having identical base addresses and index IDs into an identical group.

Referring to the first to third symbol expressions in Table 7, each of the base addresses of the first symbol expression and the second symbol expression is equal to 0x1000 while the base address of the third symbol expression is 0x2000 that differs from those of the first symbol expression and the second symbol expression.

In addition, referring to the coefficients of the index IDs Lx and Ly in the first symbol expression and the second symbol expression, the coefficient of Lx in the first symbol expression and the coefficient of Lx in the second symbol expression are equally 1. Furthermore, the coefficient of Ly in the first symbol expression and the coefficient of Ly in the second symbol expression are equally 1.

Therefore, the first operator 310 classifies the first symbol expression and the second symbol expression into a first group, and classifies the third symbol expression into a second group.

The first operator 310 operates spatial locality with respect to each of the groups in a direction in each dimension thereof. For example, the first operator 310 operates a reuse distance by substituting unit vectors in the direction in each dimension and zero vectors for the partially evaluated symbol expressions, and further operates spatial locality on the basis thereof.

Here, the zero vector is (0, 0), the unit vector in an x-direction is (1, 0), and the unit vector in a y-direction is (0, 1) when a dimension of the work space is 2. The first operator 310 calculates the reuse distance with respect to each of the groups by substituting the vectors. Here, a constant term of the symbol expression is excluded due to no influence on the reuse distance value.

For example, evaluation result of the vectors in which the vectors are respectively substituted for the first group, will be shown in Table 8 below.

TABLE 8

| |
|---|
| zero vector (0, 0) -> 0 |
| x-dim unit vector (1, 0) -> 1 |
| y-dim unit vector (0, 1) -> 1024 |

Referring to Table 8, the reuse distance in the x-direction is 1 (1−0=1) and the reuse distance in the y-direction is 1024 (1024−0=1024), in the first group.

Furthermore, evaluation results of the vectors in which the vectors are respectively substituted for the second group, will be shown in Table 9 below.

TABLE 9

| |
|---|
| zero vector (0, 0) -> 0 |
| x-dim unit vector (1, 0) -> 768 |
| y-dim unit vector (0, 1) -> 2 |

Referring to Table 9, the reuse distance in the x-direction is 768(=768−0), and the reuse distance in the y-direction is 2 (=2−0), in the first group.

The first operator 310 calculates a first value denoting spatial locality of the cache memory based on the calculated reuse distance.

For example, if the reuse distance in the direction in each dimension that is calculated in each of the groups is greater than 0 and less than a cache line size (the number of words included in one cache line) included in the cache memory, the first operator 310 judges that the cache memory has spatial locality (reuse degree) of the same value as the first value(=the cache line size/the reuse distance) in the direction in the corresponding dimension. In addition, if the reuse distance in the direction in each dimension is less than 0 or equal to or greater than the cache line size, the first operator 310 judges that the cache memory does not have spatial locality.

For example, if the cache line size is 8, the first group has a spatial locality of about 8(=8/1) in the x-direction, and the second group has a spatial locality of about 4(=8/2) in the y-direction.

The second operator 320 calculates a second value denoting footprints (a value indicating memory usage) per each of the work items in each of the groups based on spatial locality information and a reuse distance in the direction in each dimension calculated in the first operator 310. The value denoting the footprints of each of the groups is calculated based on a value denoting spatial locality in the direction in each dimension.

For example, according to one configuration, if the cache memory has no spatial locality in any direction in dimension, a value denoting the footprints may be 1. When a reuse distance D is greater than 0 and less than a cache line size S in one direction, the value denoting the footprints (the second value) may be calculated according to D (the reuse distance in corresponding direction)/S (the cache line size). Furthermore, when a first reuse distance D1 and a second reuse distance D2 are respectively greater than 0 and less than the cache line size S in two directions, the second value may be calculated according to D1*D2/(2*S2). Furthermore, when the first reuse distance D1, the second reuse distance D2 and a third reuse distance D3 are respectively greater than 0 and less than the cache line size S in three directions, the second value may be calculated according to D1*D2*D3/(6*S3). In addition, the second operator 320 calculates the value denoting the footprints (i.e., the second value) by various methods.

For example, when a reuse distance in the x-direction is 1, a reuse distance in the y-direction is 1024, and a cache line size is 8 in the first group, a value denoting the footprints per work item in the first group is calculated in 1/8 (the reuse distance in the x-direction/the cache line size). Furthermore, when a reuse distance in the x-direction is 768, a reuse distance in the y-direction is 2, and a cache line size is 8 in the second group, a value denoting the footprints per work item in the second group is calculated in 2/8 (the reuse distance in the y-direction/the cache line size).

Therefore, the value denoting the footprints per work item may be calculated in 3/8(=1/8+2/8) that is the sum of the value denoting the footprints per work item in the first group and the value denoting the footprints per work item in the second group.

In accordance with one configuration, the work-group size determiner 330 determines the work-group size based on a value denoting spatial locality calculated in the first operator 310 and a value denoting footprints calculated in the second operator 320.

The work-group size determiner 330 determines the work-group size to satisfy a cache memory capacity limit. The work-group size determiner 330 determines the work-group size so that a value denoting the footprints of the work-group (a value denoting the footprints per work item*a work-group size (=Sx*Sy)) is not greater than a cache memory capacity (i.e., the number of the cache lines included in the cache memory).

For example, when the value denoting the footprints per work item is 3/8 and the number of the cache lines is 128, the work-group size satisfies Inequality 3 below.

$$3/8 * Sx * S \leq 128 \qquad \text{Inequality 3}$$

Furthermore, the work-group size satisfies the resource constraint of the device that is described in Inequality 1. Here, when CL_DEVICE_MAX_WORK_GROUP is 1024, and CL_KERNEL_WORK_GROUP_SIZE is 768, the work-group size satisfies Inequality 4 below.

$$Sx * Sy \leq \min(1024, 768) \qquad \text{Inequality 4}$$

Furthermore, the work-group size determiner 330 determines the work-group size so that size of each direction becomes a multiple of the value denoting spatial locality. For example, the work-group size determiner 330 determines the work-group size so that the work-group size Sx in the x-direction becomes a multiple of 8, and the work-group size Sy in the y-direction becomes a multiple of 4 when a value denoting spatial locality in the x-direction is 8, and a value denoting spatial locality in the y-direction is 4.

Furthermore, the work-group size determiner 330 determines the work-group size so that the work-group size Sx in the x-direction becomes a multiple of a warp size when the device 200 has a single instruction multiple thread (SIMT) structure in which the work space is executed in warp units.

The work-group size determiner 330 selects the maximum value of Sx*Sy from among a plurality of work-group sizes (Sx, Sy) satisfying the above conditions. For example, the work-group size determiner 330 determines the work-group size (Sx, Sy) as any one of (64, 4), (32, 8), (16, 16), and (8, 32) so that Sx*Sy is maximized when the value denoting the footprints per work item is 3/8, the number of lines in the cache memory is 128, the value denoting spatial locality in the x-direction is 8, and the value denoting spatial locality in the y-direction is 4.

Figure 5:
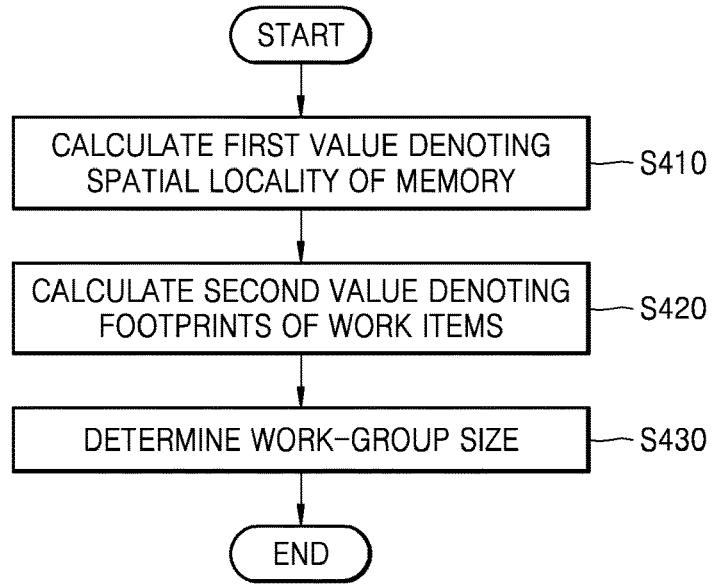
FIGS. 5 and 6 are flow charts illustrating a method of determining a work-group size according to an example.

FIG. 5 is a flow chart illustrating an example of a method of determining a work-group size.

Referring to FIG. 5, the apparatus 300 calculates spatial locality of the memory that is shared by work items included in the work-group (S401).

Operation 410 (S401) in FIG. 5 will be described in detail below by referring to FIG. 6.

Figure 6:
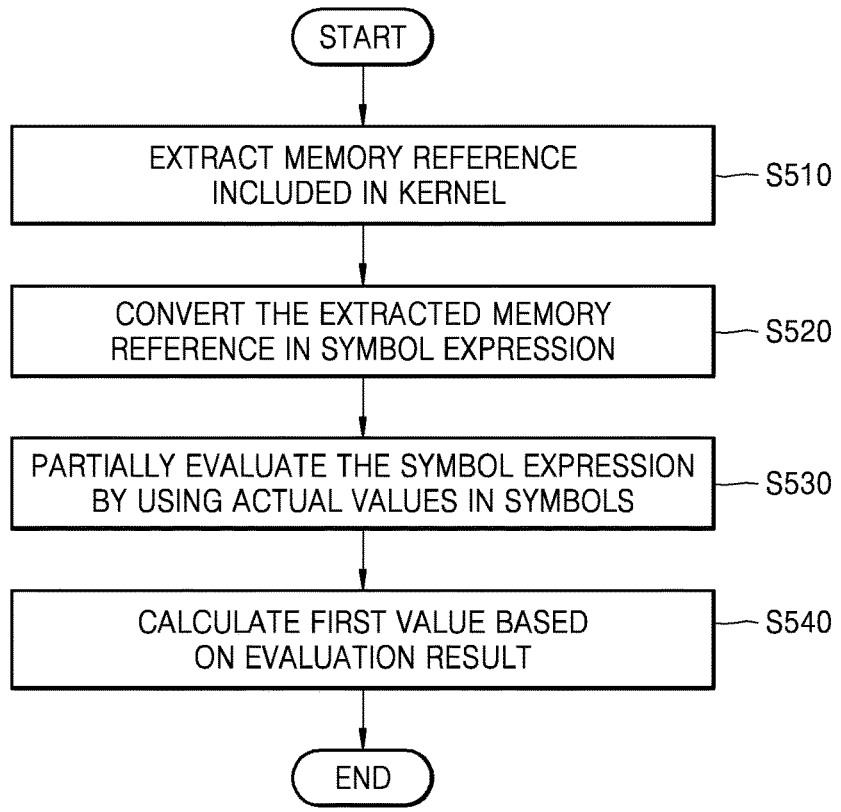

Referring to FIG. 6, the apparatus 300 extracts the memory references included in the kernel (S510).

For example, in accordance with one configuration, the memory references include input [pY*W+pX], input [pY*W+pX+n], output [pX*H+2*pY] in the kernel code described in Table 2.

The apparatus 300 replaces functions included in the extracted memory references with predefined symbols, and converts the memory references in the symbol expression (S520).

The apparatus 300 substitutes actual values for a few symbols in the symbol expression, and partially evaluates the symbol expression (S530).

For example, the apparatus 300 receives actual values of the symbols through an API such as clSetKernelArg( ). Furthermore, the apparatus 300 maps the actual values of the symbols and stores them. Furthermore, the starting point (global_work_offset) and the size (global_work_size) of the work space are provided when execution of the kernel is requested (i.e., when clEnqueueNDRangeKernel( ) API is called), and the apparatus 300 maps the given values to corresponding symbols.

In accordance with one configuration, the apparatus 300 uses the actual values mapped in variables or symbols and partially evaluates the symbol expressions (the first to third symbol expressions).

The apparatus 300 uses the evaluation result and the cache line size and calculates the value (i.e., the first value) denoting spatial locality in the direction in each dimension (S540).

For example, the apparatus 300 groups the partially evaluated symbol expressions. Here, the apparatus 300 groups the partially evaluated symbol expressions based on the coefficients of the base addresses and the index IDs in the symbol expressions, and classifies the symbol expressions having the identical base addresses and index ID into an identical group.

Furthermore, the apparatus 300 operates a value denoting spatial locality with respect to each of the groups in the direction in each dimension. For example, the apparatus 300 calculates a reuse distance by substituting the unit vectors for the direction in each dimension and the zero vector for the symbol expression in the direction in each dimension, and further calculates a value denoting spatial locality on the basis thereof.

The zero vector is (0, 0), the unit vector in the x-direction is (1, 0), and the unit vector in the y-direction is (0, 1) when a dimension of the work space is 2. The apparatus 300 calculates the reuse distance with respect to each of the groups by substituting the vectors. The constant term of the symbol expression is excluded due to no influence on the reuse distance value.

When the reuse distance in the direction in each dimension that is calculated in each of the groups is greater than 0 and less than the cache line size (the number of words included in one cache line) included in the cache memory, the apparatus 300 judges that the cache memory has spatial locality of the same value as the first value(=cache line size/reuse distance) in the direction in the corresponding dimension. In addition, if the reuse distance in the direction in each dimension is less than or equal to 0 or equal to or greater than the cache line size, the apparatus 300 judges that the cache memory does not have spatial locality.

Referring to FIG. 5 again, in accordance with one configuration, the apparatus 300 calculates the second value denoting footprints (a value indicating memory usage) per each of the work items in each of the groups based on the spatial locality information and the reuse distance in the direction in each dimension that are calculated above (S420).

The footprints of each of the groups is calculated based on a value denoting spatial locality in the direction in each dimension and is described in FIG. 4, therefore the detailed description will be omitted.

Further, the apparatus 300 determines work-group size based on the value denoting the calculated spatial locality and the value denoting the calculated footprints (S430).

For example, in accordance with one configuration, the apparatus 300 determines the work-group size to satisfy the cache memory capacity limit. The apparatus 300 determines the work-group size so that the value denoting the footprints of the work-group (the value denoting the footprints per work item*the work-group size(=Sx*Sy)) is not greater than the cache memory capacity (i.e., the number of the cache lines included in the cache memory).

Furthermore, the apparatus 300 determines the work-group size to satisfy the resource constraint of the device that is described in Inequality 1. Furthermore, the apparatus 300 determines the work-group size so that the size of each direction becomes a multiple of the value denoting spatial locality. Furthermore, the work-group size determiner 330 determines the work-group size so that the work-group size Sx in the x-direction becomes a multiple of the warp size when the device 200 has the single instruction multiple thread (SIMT) structure in which the work space is executed in the warp units. In addition, the apparatus 300 selects the maximum value of Sx*Sy from among the plurality of the work-group sizes (Sx, Sy) satisfying the above conditions.

The apparatuses illustrated in FIGS. 1, 3, and 4 that perform the operations described herein with respect to FIGS. 5 and 6 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1, 3, and 4. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5 and 6 that perform the operations described herein with respect to FIGS. 1, 3, and 4 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining a work-group size comprising:
   analyzing, using at least one processor, kernel code including a work-group;
   calculating, using the at least one processor, a first value denoting spatial locality of a memory that is shared by one or more work items included in the work-group;
   calculating, using the at least one processor, a second value denoting footprints of the one or more work items included in the work-group based on the first value;
   determining, using the at least one processor, the work-group size based on the first and second values; and
   executing, using the at least one processor, the kernel code using the determined work-group size, wherein
   the calculating the first value includes,
      converting a memory reference included in the kernel code into a symbol expression including at least one desired symbol,
      partially evaluating the symbol expression by substituting a value corresponding to the at least one desired symbol included in the symbol expression into the symbol expression,
      calculating a reuse distance by substituting a zero vector and unit vectors into the partially evaluated symbol expression, the zero vector based on a number of dimensions of a work-space of the kernel code, and each of the unit vectors corresponding to a separate dimension of the work-space; and
      calculating the first value based on the calculated reuse distance and a memory line size of the memory.

2. The method of claim 1, wherein the calculating the first value further comprises:
   receiving an actual value corresponding to the at least one desired symbol; and
   mapping the received actual value to the at least one desired symbol in the kernel code.

3. The method of claim 1, wherein the calculating the second value comprises calculating the second value based on the calculated reuse distance and the memory line size.

4. The method of claim 1, wherein the first value comprises at least one of a value denoting spatial locality in a first direction of the work-group and a value denoting spatial locality in a second direction of the work-group.

5. The method of claim 1, further comprising:
   calculating, using the at least one processor, a third value denoting footprints of the work-group, wherein the third value is a multiplication value of the second value and the work-group size.

6. The method of claim 5, wherein the determining the work-group size comprises determining the work-group size so that the third value is lesser than or equal to a total number of memory lines included in the memory.

7. The method of claim 6, wherein the determining the work-group size comprises determining the work-group size so that the work-group size is a multiple of the first value.

8. The method of claim 7, wherein the determining the work-group size comprises:
   determining a largest work-group size as the work-group size, from among a plurality of potential work-group sizes that make the third value become smaller than or equal to the total number of memory lines included in the memory; and
   setting the work-group size as the multiple of the first value.

9. An apparatus for determining a work-group size comprising:
   a memory including a plurality of memory lines; and
   at least one processor configured to,
      analyze a kernel code including a work-group;
      calculate a first value denoting spatial locality of a memory that is shared by one or more work items included in the work-group;
      calculate a second value denoting footprints of the one or more work items included in the work-group based on the first value;
      determine the work-group size based on the first and second values; and
      execute the kernel code using the determined work-group size, wherein the calculating the first value includes,
         convert a memory reference included in the kernel code into a symbol expression including at least one desired symbol,
         partially evaluate the symbol expression by substituting a value corresponding to the at least one desired symbol included in the symbol expression into the symbol expression,
         calculate a reuse distance by substituting a zero vector and unit vectors into the partially evaluated symbol expression, the zero vector based on a number of dimensions of a work-space of the kernel code, and each of the unit vectors corresponding to a separate dimension of the work-space, and
         calculate the first value based on the calculated reuse distance and a memory line size of the memory.

10. The apparatus of claim 9, wherein the at least one processor is further configured to map an actual value corresponding to the at least one desired symbol to the symbol.

11. The apparatus of claim 9, wherein the at least one processor is further configured to calculate the second value based on the calculated reuse distance and the memory line size.

12. The apparatus of claim 9, wherein the first value comprises at least one of a value denoting spatial locality in a first direction of the work-group and a value denoting spatial locality in a second direction of the work-group.

13. The apparatus of claim 9, wherein the at least one processor is further configured to calculate a third value denoting footprints of the work-group, wherein the third value is a multiplication value of the second value and the work-group size.

14. The apparatus of claim 13, wherein the at least one processor is further configured to determine the work-group size so that the third value is less than or equal to a total number of memory lines included in the memory.

15. The apparatus of claim 14, wherein the at least one processor is further configured to determine the work-group size so that the work-group size becomes a multiple of the first value.

16. The apparatus of claim 15, wherein the at least one processor is further configured to:
   determine a largest work-group size as the work-group size, from among a plurality of potential work-group sizes that make the third value become less than or equal to the total number of memory lines in the memory; and
   set the work-group size as the multiple of the first value.

* * * * *